No. 623,323. Patented Apr. 18, 1899.
J. R. K. LAW.
DRIVING GEAR FOR CYCLES.
(Application filed Dec. 22, 1897.)

(No Model.)

United States Patent Office.

JOHN RICHARD KIDSTON LAW, OF GLASGOW, SCOTLAND.

DRIVING-GEAR FOR CYCLES.

SPECIFICATION forming part of Letters Patent No. 623,323, dated April 18, 1899.

Application filed December 22, 1897. Serial No. 662,969. (No model.)

*To all whom it may concern:*

Be it known that I, JOHN RICHARD KIDSTON LAW, iron merchant, of 20 Ashton Gardens, Hillhead, Glasgow, in the county of Lanark, Scotland, have invented certain new and useful Improvements in Driving-Gear for Cycles, Motor-Cars, and other Vehicles, (for which I have obtained a patent in Great Britain, No. 29,635, bearing date the 24th day of December, 1896,) of which the following is a specification.

My invention relates to improvements in the driving-gear of cycles, motor-cars, and other vehicles, and has for its object to enable the rider or occupant to alter and adjust the gear to whatever amount of work per cycle of operations he or they desire to do or is required to be done irrespective of the condition of the road on which the machine is traveling, whether it be on a level road, up or down hill, or against wind, &c.

According to my invention the machine is propelled by successive impulses. The action consists of two independent parts, viz: first, storage of energy equal to the work set to be done during a complete cycle of operations or some definite part thereof, (in which time the motive power is not contributing immediately to the momentum of the machine,) and, secondly, the release and transmission of such stored energy to the machine.

Figure 1:
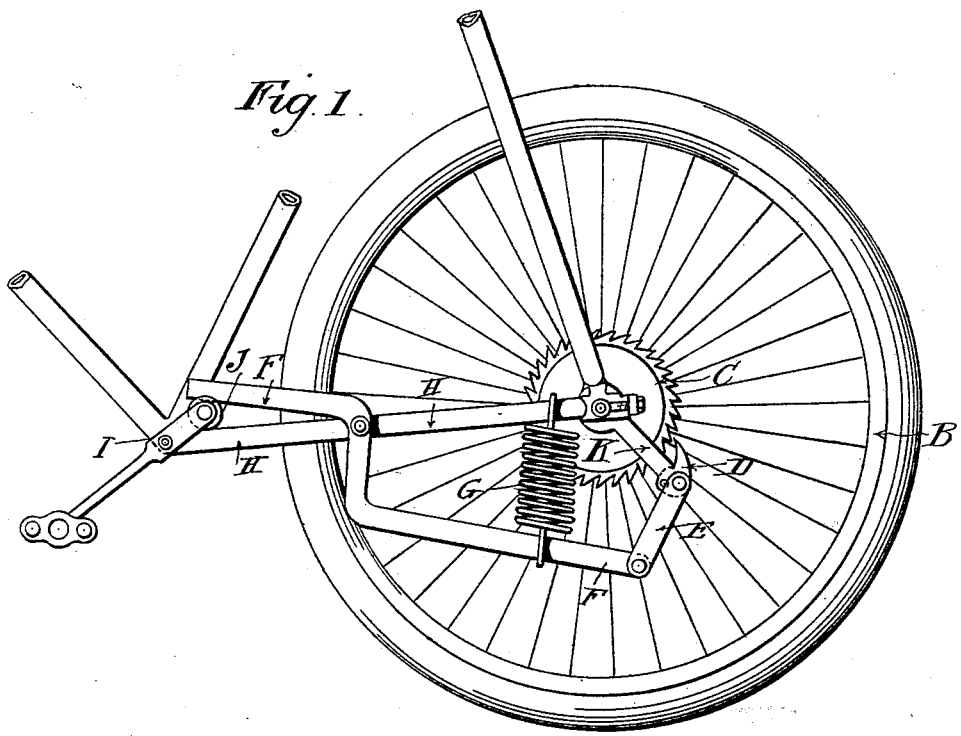
Figure 2:
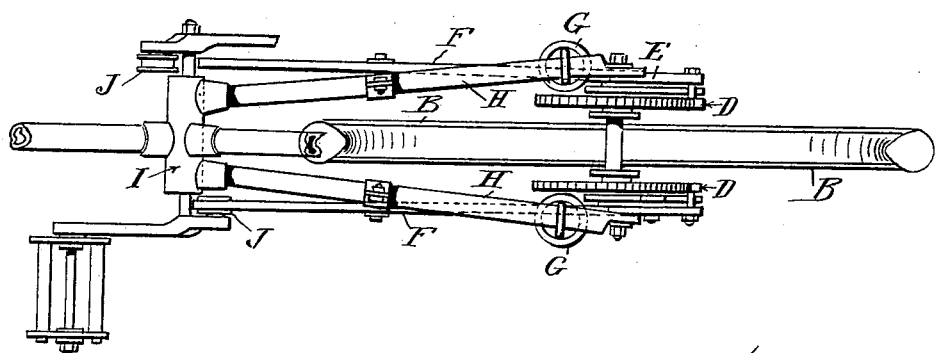

Figure 1 is a side elevation of part of a bicycle constructed in accordance with my improvements. Fig. 2 is a plan view.

In carrying out my invention as applied to bicycles I attach to the hub of the rear wheel B a ratchet-wheel C, the teeth of which engage with a pawl D. The pawl D is pivoted, first, to the extremity of the radial guide-bar K, (K being free to turn in the boss of the ratchet-wheel.) At a point somewhat behind the first pivot the pawl D is, secondly, pivoted to the upper end of the connecting-rod E. The lower end of the connecting-rod E is pivoted to the rear end of the bent lever F. The other end of this lever F in its up-and-down motion just clears the treadle-shaft. This lever F is so arranged that an adjustable spring G is connected to it and the rod H, which extends from the treadle-shaft I to the axle of the rear wheel. By sliding the spring G backward and forward the amount of energy stored per half-revolution is increased or diminished as the distention of the spring G is greater or less, according to the position in which it is set, and this amount of energy and the work required to store it remain constant whether the machine is running on a light or heavy road, so that for each set position the amount of work the rider has to do per revolution remains the same—that is to say, the amount of energy stored in each half-revolution is constant—but the distance each impulse drives the machine depends on the resistance caused by state of road, gradient, wind, &c. A similar arrangement is applied to each side of the machine, as shown in Fig. 2.

The lever F, which causes the tension on the spring G, is lifted by a roller J to reduce friction, and so soon as a half-revolution of the treadle is made the bar F is released from the roller J and the stored energy given off. While the tension is being put on the spring, the pawl D is (owing to its eccentric pivoting) out of gear with the ratchet-wheel or lightly touching the tips of the teeth, as shown in the drawings, while the first effect of the released spring is to throw it (the pawl) into instant gear as the pressure is applied through the rear pivot. In lieu of the ratchet-wheel as described a friction or clutch wheel might be used.

Of course it is to be understood that I do not confine myself to the precise arrangement of gearing as described, as there are other ways of carrying out my invention without deviating from the principle involved therein.

I claim—

1. In the driving-gear of vehicles the combination with the frame, the drive-shaft and the drive-wheel, of a treadle-crank mounted on the drive-shaft, a lever pivoted on the frame and having one end engaging the treadle-crank, a spring secured to said lever and the frame, and a clutch mechanism whereby the lever may be placed in engagement with, and disengaged from the drive-wheel, substantially as described.

2. In the driving-gear of vehicles, the combination with the frame, the drive-shaft and the drive-wheel, of a treadle-crank mounted on the drive-shaft and having an extension carrying an antifrictional roller, a lever pivoted on the frame and having one end engaging the roller on the treadle-crank, a spring secured to said lever and frame and a clutch mechanism whereby the lever may be placed in engagement with, and disengaged from the drive-wheel, substantially as set forth.

3. The combination with a vehicle-frame, drive-shaft and drive-wheel, of a treadle-crank mounted in said frame and carrying the roller J, the bent lever F pivoted to the frame and operated by the crank, spring G secured to said lever and frame, ratchet-wheel C secured to the drive-wheel, pawl D adapted to engage said ratchet-wheel, and connections between said pawl, wheel and bent lever, substantially as set forth.

In testimony whereof I have signed my name to this specification in the presence of two witnesses.

JOHN RICHARD KIDSTON LAW.

Witnesses:
JOHN LIDDLE,
EDITH MARY EDMONDSTONE.